No. 623,257. Patented Apr. 18, 1899.
W. O'ROURKE.
DAMPENING APPARATUS.
(Application filed Oct. 7, 1897.)
(No Model.)
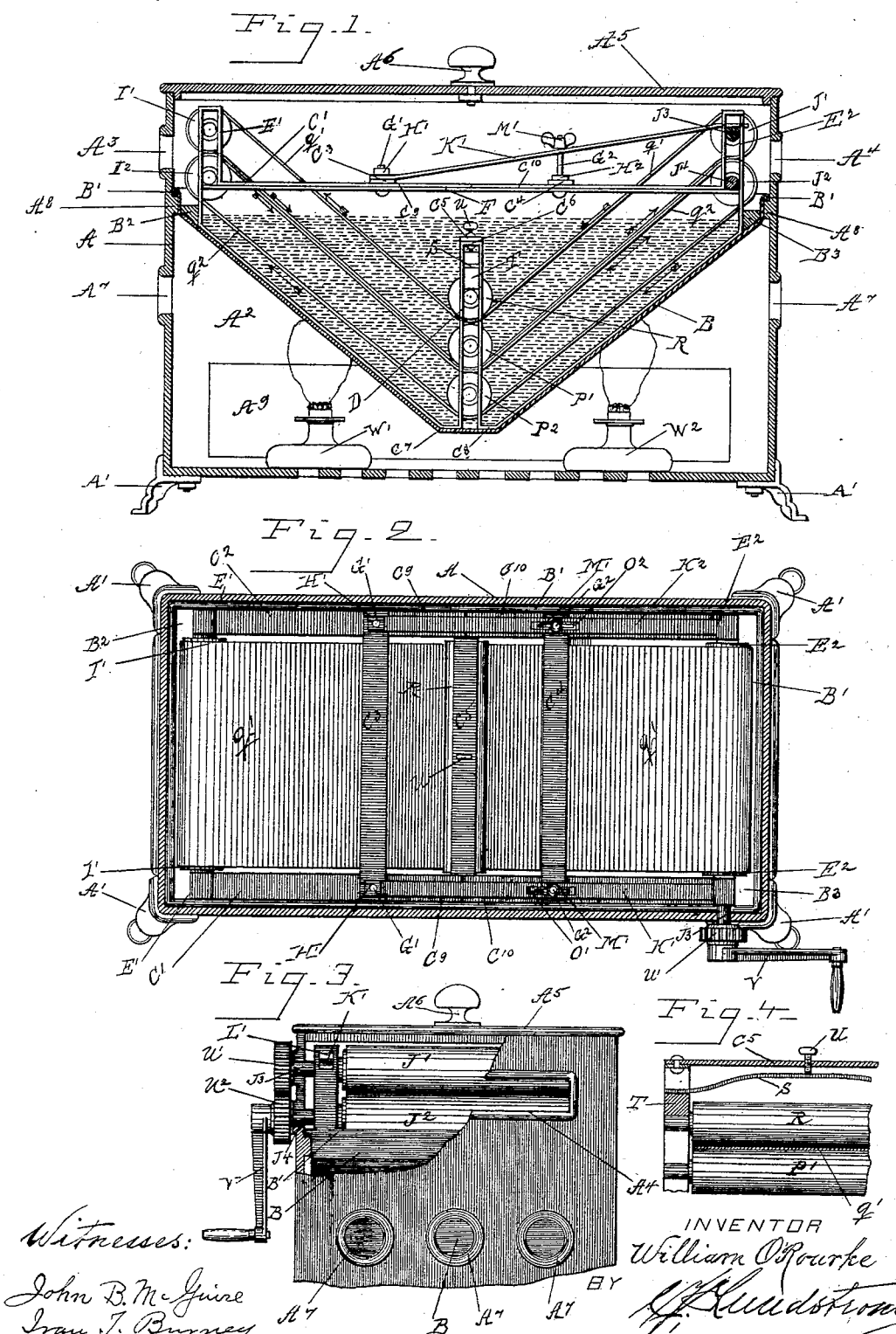

UNITED STATES PATENT OFFICE.

WILLIAM O'ROURKE, OF LITTLE FALLS, NEW YORK.

DAMPENING APPARATUS.

SPECIFICATION forming part of Letters Patent No. 623,257, dated April 18, 1899.

Application filed October 7, 1897. Serial No. 654,381. (No model.)

*To all whom it may concern:*

Be it known that I, WILLIAM O'ROURKE, a citizen of the United States, residing at Little Falls, in the county of Herkimer, State of New York, have invented a new and useful Dampening Apparatus, of which the following is a specification.

The machines now in use for producing hot towels consist of a covered water-receptacle having a perforated shelf situated above the surface of the water. The water is heated and produces steam which penetrates the perforated shelf, heating the towels which are placed on the same. By so heating the towels the same very frequently become too moist and have to be handled and wrung out after being taken out of the machine. Being subjected to the high temperature of steam, it is also necessary to cool the towels before applying them to the face. This, combined with the further disadvantage of having to wait for the towels to become hot, renders such a machine highly impractical.

The objects of my invention are to overcome these objectionable features and produce a machine in which any number of towels may be heated continually and delivered with any desired degree of moisture and temperature. I attain these objects in the construction illustrated in the accompanying drawings, in which—

Figure 1 is a partly-sectional and partly-elevated side view of the invention. Fig. 2 is a top view of the same with cover removed. Fig. 3 is an elevated end view with portions of the outer casing removed. Fig. 4 is a detail view of the tension-roller.

Similar letters refer to corresponding parts throughout the several views.

A represents a casing preferably made of metal and provided with four supporting-feet A'. The bottom of the casing is perforated for the purpose of admitting air into the heating-chamber $A^2$, which is further provided with air-outlets $A^7$, situated at the upper portion of the said heating-chamber perforating the walls at each end of the casing. Situated at the upper portion and at each end of the casing are two longitudinal slots $A^3$ and $A^4$, through which the towels are admitted into and discharged from the machine proper.

$A^5$ represents the cover of the casing, and $A^6$ a knob or handle for same.

Inside of the casing is removably mounted a sheet-metal tank or receptacle B, adapted to hold water. This receptacle is provided at its upper edge with a flange B', which normally rests on an inwardly-extending rim $A^8$, located on the inner side of the casing, thus holding the receptacle suspended from the bottom of the casing and providing the heating-chamber above referred to. The water-receptacle is made conical (seen from the side) in order to eliminate lost space and to conform with the shape of the band-iron frame hereinafter mentioned.

C represents a band-iron frame composed of two similarly-bent side pieces $C'$ $C^2$ and three cross-pieces $C^3$ $C^4$ $C^5$, which connect the side pieces and act as braces for the same. Each of the side pieces is preferably made of one-inch band-iron and formed by first bending same downward on each side of its central portion $C^6$, so as to form a parallel channel D, then bending it at both sides at a right angle to the said channel, so as to form two horizontal bottom supports $C^7$ $C^8$, from whence the strips are continued upwardly at an angle to the said bottom supports, and then in an upright, horizontal, and downward direction, so as to form two upper vertical guide-channels $E'$ $E^2$, from which the remaining end portions $C^9$ $C^{10}$ of the strip are bent inwardly at a right angle to the said upper guide-channels and are united by a strap F, which is clamped to the end portions of the strip by means of two bolts $G'$ $G^2$, having nuts $H'$ $H^2$. This frame is placed in the water-receptacle and rests on its bottom. It is supported in a lateral direction by the longitudinal sides of the receptacle and by two metal braces $B^2$ $B^3$, placed on the inside at each end of the receptacle. The latter braces permit the end portions of the water-receptacle to extend beyond the feed and wringing rollers hereinafter referred to, thus preventing the water carried up to the said rollers to drip outside of the receptacle. In the upper guide-channels, at one end of the frame, are revolubly mounted two feed-rollers $I'$ $I^2$ and in the upper guide-channels, at the other end of the frame, two wringing-rollers $J'$ $J^2$. The wringing-rollers are pressed together by means of two flat springs K' K², which are clamped to the side pieces of the frame by the bolts G' G' and nuts H' H', the springs projecting through slots L' L². The tension of these springs is regulated by two thumb-nuts M' M² engaging the bolts which project through slots O' O² in the springs.

P' and P² represent two guide-rollers revolubly mounted in the lower central guide-channel D. Communicating with these guide-rollers and the feed and wringing rollers above referred to are two endless belts Q' Q², adapted to carry the towels inserted between the feed-rollers down in the water and from there conveying the towels up to the wringing-rollers at the other end of the machine.

In order to maintain a suitable tension of the belts, I provide a tension-roller R, revolubly mounted in the lower central guide-channel and situated above the two guide-rollers. This tension-roller is caused to exert a pressure upon the upper surface of the belt by means of the tension-spring S, which engages the bearing-block T. This tension-spring is regulated by means of a thumb-screw U, which engages the central portion of the cross-piece C⁵.

U' U² represent two cog-wheels intermeshing with each other and secured to the shafts J³ J⁴ of the wringing-rollers. Secured to the shaft of the lower wringing-roller and situated on the outer side of the lower cog-wheel is a crank V, by which the machine is operated.

W' W² represent two alcohol-lamps by which the water in the receptacle is heated. These lamps are inserted and regulated through an opening A⁹, located on one side of the casing.

By turning the crank the endless belts are made to move in the direction indicated by the arrows and transmit their motion to the guide and feed rollers. By then inserting the towel through the receiving-slot A³ between the feed-rollers the towel is carried down in the water-receptacle between the two endless belts and after having passed between the two guide-rollers is conveyed upwardly to the wringing-roller, between which the towel is pressed and relieved of its surplus of moisture. Having passed between the wringing-rollers, the towel drops out hot and dry through the slot A⁴, situated in front of the said rollers.

The shape of the frame renders it very easy to remove the rollers when it becomes necessary to renew either the belts or the rollers. By lifting the frame out of the tank and then removing the strap which is clamped to the end portions of the side pieces the rollers are free to drop out.

As the water-receptacle is loosely supported in the casing it can also be quickly removed and cleaned.

Although I have described my invention as a hot-towel machine for barbers, it will be understood that it may be used for other purposes. For instance, it may be used for producing moist sheets for copying-books, in which case, of course, the water need not be heated. It may also be used for coloring ribbons or strips of cloth, in which case the receptacle would contain a colored solution instead of water.

I am aware that many changes may be made in the construction herein shown and described without departing from the spirit and scope of my invention, and for that reason I reserve the right to make such changes as the state of the art may permit.

Having thus described my invention, what I claim as new, and desire to secure by Letters Patent, is—

1. The combination with a water-receptacle, a surrounding casing forming a support and heating-chamber for said receptacle, a frame removably mounted in said receptacle, two guide-rollers revolubly mounted in the lower central portion of the said frame, two feed-rollers revolubly mounted at one end of the upper portion of the frame, two wringing-rollers revolubly mounted at the other end of the upper portion of the frame, means for turning the rollers, one upper and one lower carrying-belt respectively engaging the upper and lower feed and wringing rollers and the said guide-rollers, means for regulating the tension of the said belts, substantially as described and for the purpose set forth.

2. A water-receptacle having a bottom which inclines toward the center from opposite ends, and which receptacle has an opening through each end, suitable bearings placed upon the center of the bottom, and three rollers which are journaled therein, combined with bearings placed at each end of the receptacle, two rollers journaled in each of the end bearings, and two endless belts which are passed around the rollers; each pair of end rollers being journaled just opposite the opening through the end of the receptacle, substantially as shown.

3. A water-receptacle having a bottom which inclines toward the center from each end, suitable bearings journaled upon the bottom, three rollers journaled in the bearings, suitable bearings at each end of the receptacle, and two rollers journaled in each of the end bearings, combined with the two belts which are passed around the two sets of end rollers and under the central rollers, means for revolving one of the pairs of end rollers, and the flat tension-springs K' secured at one end to the frame and having their other ends bear upon the journals of the rollers, and suitable tightening devices, substantially as specified.

WILLIAM O'ROURKE.

Witnesses:
JOHN B. McGUIRE,
IVAN T. BURNEY.